(No Model.)
W. W. TYSON.
TRANSPLANTER AND WEEDER.
No. 576,703. Patented Feb. 9, 1897.
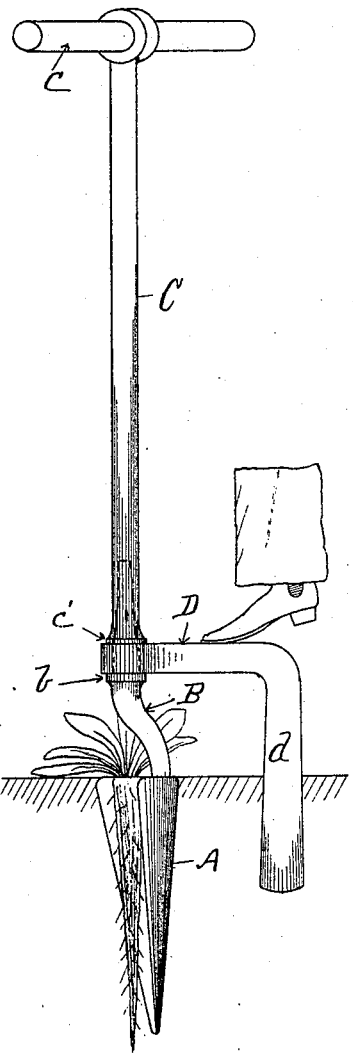
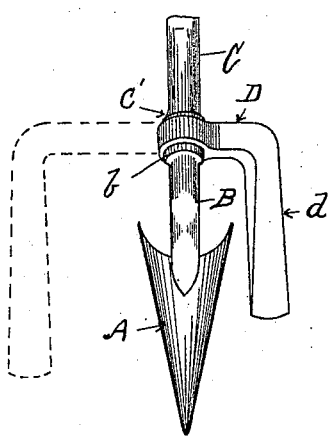
WITNESSES:
Fred Einfeldt
A. L. Jackson
INVENTOR
William W. Tyson
BY H. Sturgeon
ATTORNEY

UNITED STATES PATENT OFFICE.

WILLIAM W. TYSON, OF ERIE, PENNSYLVANIA.

TRANSPLANTER AND WEEDER.

SPECIFICATION forming part of Letters Patent No. 576,703, dated February 9, 1897.

Application filed June 22, 1896. Serial No. 596,401. (No model.)

*To all whom it may concern:*

Be it known that I, WILLIAM W. TYSON, a citizen of the United States, residing at the city of Erie, in the county of Erie and State of Pennsylvania, have invented certain new and useful Improvements in Transplanting and Weed-Removing Spades; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in transplanting and weed-removing spades; and it consists substantially in combining therewith an arm pivoted around the shank of the spade provided with a downward projection which enters the earth and operates as a support while the spade is being rotated, as set forth and illustrated in the accompanying drawings, in which—

Figure 1 is a side view in elevation of my improved transplanting and weed-removing spade in operation. Fig. 2 is a front view in elevation of a section thereof.

In the construction of my invention illustrated in the accompanying drawings, A is a semiconical spade-blade, to which a shank B is secured, curved forward so that at the point where it enters the handle C, provided with cross-handles $c$, it is exactly central with the arc of a circle described by the spade-blade A. On this shank at the point where it joins the handle C is a collar $b$, and on the lower end of the handle C there is a like collar $c'$. Between these collars there is secured a horizontal arm D, adapted to rotate freely around the shank B, and on the end of the arm D there is a downward projection $d$, adapted to enter the ground a sufficient distance to operate as a support for the arm D, so that when the spade A is forced into the ground it can be rotated within the arm D, which operates as a support therefor during this operation. The arm D also performs the function of a foot-piece upon which the operator places his foot to force the spade and the projection $d$ into the ground.

In operation the spade A is forced down immediately adjacent to the side of the plant to be removed, and at the same operation the projection $d$ is also forced into the ground. The operator then rotates the spade A by means of the handles $c$ and cuts up a cone of earth with the plant to be removed therein, the arm D and projection $d'$ operating as a support for the shank of the spade during this operation.

I am aware of transplanting devices embodying two conical spades, one swinging within the other, each of which is provided with a handle adapted to be grasped by the operator, so that one can be swung around opposite the other and cut out a conical piece of earth and lift it; but this device is only adapted to be operated in soft earth and useful only in lifting a considerable quantity of the earth surrounding the plant to be transplanted, which is wholly unlike mine either in construction or operation.

Having thus fully described my invention, so as to enable others to construct and operate the same, what I claim as new, and desire to secure by Letters Patent of the United States, is—

The combination in a transplanting and weed-removing spade, of a vertical handle C and a cross-handle $c$ on the top thereof for rotating it, a curved and laterally-projecting shank B secured in the lower end of said handle C, a semiconical spade A secured to the shank B, an arm D journaled around the upper part of the shank B and adapted to support the foot of the operator, and a downward projection adapted to be forced into the ground some distance beyond the circle described by the rotation of the shovel A, so as to support the tool while the shovel is being rotated, substantially as and for the purpose set forth.

In testimony whereof I affix my signature in presence of two witnesses.

WILLIAM W. TYSON.

Witnesses:
 NOAH W. LOWELL,
 FRED EINFELDT.